US008718722B2

(12) United States Patent
Fukunaga

(10) Patent No.: US 8,718,722 B2
(45) Date of Patent: May 6, 2014

(54) EARPHONE MICROPHONE-MOUNTABLE ELECTRONIC APPLIANCE

(75) Inventor: Toshiaki Fukunaga, Osaka (JP)

(73) Assignee: KYOCERA Corporation, Kyoto (JP)

( * ) Notice: Subject to any disclaimer, the term of this patent is extended or adjusted under 35 U.S.C. 154(b) by 512 days.

(21) Appl. No.: 12/399,405

(22) Filed: Mar. 6, 2009

(65) Prior Publication Data
US 2009/0227298 A1 Sep. 10, 2009

(30) Foreign Application Priority Data

Mar. 10, 2008 (JP) ................................. 2008-060275

(51) Int. Cl.
*H04M 1/00* (2006.01)
(52) U.S. Cl.
USPC ...................... 455/575.2; 455/569.1; 455/568; 381/74; 381/384; 381/111
(58) Field of Classification Search
None
See application file for complete search history.

(56) References Cited

U.S. PATENT DOCUMENTS

| 6,069,960 | A | 5/2000 | Mizukami et al. |
| 6,594,366 | B1 * | 7/2003 | Adams .............................. 381/74 |
| 6,856,046 | B1 * | 2/2005 | Scarlett et al. ................. 307/125 |
| 7,340,284 | B2 * | 3/2008 | Chung ........................ 455/569.1 |
| 7,836,216 | B2 * | 11/2010 | Kashi et al. ...................... 710/15 |
| 7,869,608 | B2 * | 1/2011 | Sander et al. .................. 381/113 |
| 2005/0201568 | A1 * | 9/2005 | Goyal .............................. 381/74 |
| 2007/0049103 | A1 * | 3/2007 | Kashi et al. .................... 439/396 |
| 2008/0130911 | A1 * | 6/2008 | Tsen ................................ 381/74 |
| 2008/0164994 | A1 * | 7/2008 | Johnson et al. ............... 340/533 |
| 2011/0150234 | A1 * | 6/2011 | Johnson et al. ................. 381/74 |

FOREIGN PATENT DOCUMENTS

| JP | H04-286747 | 10/1992 |
| JP | H10-079997 | 3/1998 |
| JP | H11-162574 | 6/1999 |
| JP | 2000-340312 | 12/2000 |
| JP | 2001-237946 | 8/2001 |
| JP | 2002-141980 | 5/2002 |

OTHER PUBLICATIONS

Japanese language Notice of Allowance for corresponding Japanese Patent Application No. 2008-060275 dated May 11, 2010.

* cited by examiner

*Primary Examiner* — Vladimir Magloire
(74) *Attorney, Agent, or Firm* — Procopio, Cory, Hargreaves & Savitch LLP

(57) ABSTRACT

In order to mount a plurality of kinds of earphone microphones, a mobile phone includes an earphone microphone terminal to accept either a plug of a PTT earphone microphone or a plug of an earphone microphone, and an earphone microphone switching portion to detect whether the PTT earphone microphone or the earphone microphone is accepted and switch a contact point between a plurality of contact points of the earphone microphone terminal depending on the kind of the detected earphone microphone.

13 Claims, 6 Drawing Sheets

F I G. 1 A
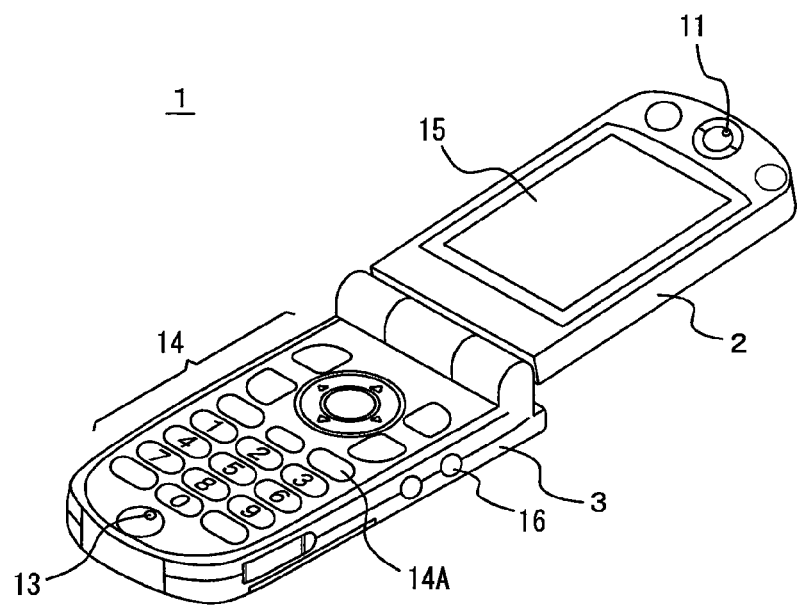
F I G. 1 B
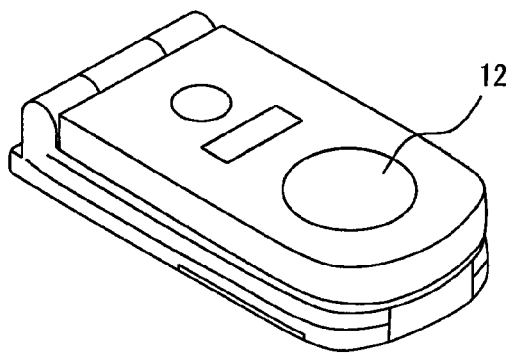

FIG. 6

| | NO CONNECTION | PTT EARPHONE MICROPHONE | | EARPHONE MICROPHONE | |
|---|---|---|---|---|---|
| | | PTT SWITCH OFF | PTT SWITCH ON | MICROPHONE SWITCH OFF | MICROPHONE SWITCH ON |
| SECOND PTT BUTTON DETECTING PORTION | L | H | L | L | L |
| FIRST PTT BUTTON DETECTING PORTION | UNDETECTED | UNDETECTED | DETECTED | UNDETECTED | UNDETECTED |
| SECOND MICROPHONE DETECTING PORTION | L | H | H | H | L |
| FIRST MICROPHONE DETECTING PORTION | UNDETECTED | UNDETECTED | UNDETECTED | UNDETECTED | DETECTED |

EARPHONE MICROPHONE-MOUNTABLE ELECTRONIC APPLIANCE

CROSS-REFERENCE TO RELATED APPLICATION

The present application claims priority under 35 U.S.C. §119 of Japanese Patent Application No. 2008-060275, filed Mar. 10, 2008, entitled "EARPHONE MICROPHONE-MOUNTABLE ELECTRONIC DEVICE", the content of which is hereby incorporated in its entirety.

BACKGROUND OF THE INVENTION

1. Field of the Invention

The present invention relates to an electronic appliance and particularly to an earphone microphone-mountable electronic appliance.

2. Description of the Related Art

To conventional electronic appliances such as mobile phones, earphone microphones provided with PTT (Push To Talk) buttons (hereinafter referred to as "PTT earphone microphones") and earphone microphones without PTT buttons are mountable. The plugs of the PTT earphone microphones differ from those of the earphone microphones in that PTT button pins are provided, but the shapes of the plugs of the PTT earphone microphones with the PTT button pins excluded are the same as those of the plugs of the earphone microphones. In some cases, however, the plugs of the PTT earphone microphones differ from those of the earphone microphones in arrangement of the contact points. For example, a grounded portion and a portion for a right audio signal (R signal) input to the right earphone or for a left audio signal (L signal) input to the left earphone might be arranged in reserve.

This poses the problem of having to provide separate jacks for the plug of the PTT earphone microphone and that of the earphone microphone, thus necessitating a plurality of associated circuits.

In view of this, a single jack to which both the plugs of the PTT earphone microphone and the earphone microphone are mountable is contemplated. However, this necessitates judgment as to whether the plug of the PTT earphone microphone or that of the earphone microphone is being mounted.

A known method for judgment between a stereo headphone plug and an earphone microphone plug utilizes the fact that impedance varies in a large degree between the stereo headphone and the earphone microphone. However, this involves application of DC voltage to the stereo headphone; if not prepared for voltage application, the stereo headphone might be damaged, or fail in the worst case. Thus, it is impossible to use the conventional judgment method that involves detection of plug insertion while predetermining the location of the grounded portion in the plug.

SUMMARY OF THE INVENTION

The present invention is made to solve the aforementioned problems. An object of the present invention is to provide an electronic appliance to which the plugs of a plurality of kinds of earphone microphones are mountable.

Another object of the present invention is to provide an electronic appliance capable of judging which one of the plurality of kinds of earphone microphones is being connected to the electronic appliance.

In order to achieve the aforementioned objects, an electronic appliance according to an aspect of the present invention includes: an accepting portion to accept either a plug of a first kind of earphone microphone or a plug of a second kind of earphone microphone; a detecting portion to detect whether the plug of the first kind of earphone microphone or the plug of the second kind of earphone microphone is accepted; and a switching portion to switch a contact point to be grounded among a plurality of contact points of the accepting portion depending on a kind of a detected earphone microphone.

According to another aspect of the present invention, an electronic appliance includes: an accepting portion to accept a plug of an earphone microphone; a voltage applying portion to apply voltage to an ungrounded contact point among a plurality of contact points of the accepting portion; a voltage detecting portion to detect voltage at a voltage-applied contact point; a current detecting portion to detect current through the voltage-applied contact point; and a judging portion to judge whether a first kind of earphone microphone or a second kind of earphone microphone is accepted based on the detections by the voltage detecting portion and the current detecting portion.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 1A and 2B are perspective views of a mobile phone according to an embodiment of the present invention.

FIG. 6 is a diagram showing detection states at a switching control portion.

DESCRIPTION OF THE PREFERRED EMBODIMENTS

Figure 2:
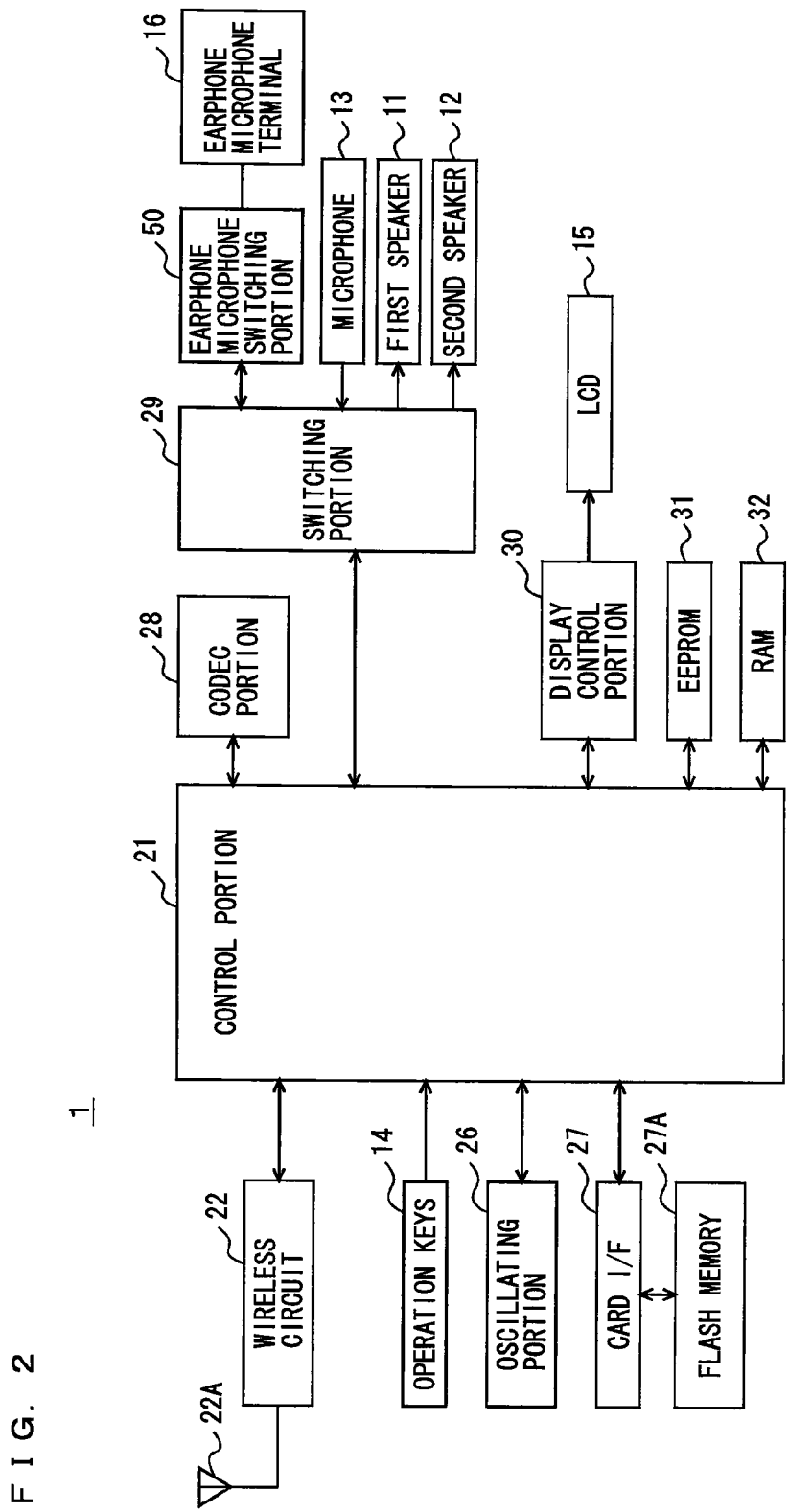
FIG. 2 is a functional block diagram schematically showing the functions of the mobile phone according to the embodiment of the present invention.

The preferred embodiments of the present invention will be described below in conjunction with the drawings. In the following description, the same or corresponding parts are denoted by the same reference characters. Their names and functions are also the same. Thus, a detailed description thereof will not be repeated.

FIGS. 1A and 2B are perspective views of a mobile phone according to an embodiment of the present invention. FIG. 1A shows a mobile phone 1 in an open style, and FIG. 1B shows mobile phone 1 in a closed style. Referring to.

FIGS. 1A and 1B, mobile phone 1 includes an operation side portion 3 and a display side portion 2. Operation side portion 3 has, on its inner surface, operation keys 14 including a power key 14A, numeral keys, and a communication key, and a microphone 13, and on the right surface, an earphone microphone terminal 16. Display side portion 2 has, on its inner surface, a liquid crystal display (LCD) device 15 and a first speaker 11 constituting a receiver, and on the outer surface, a second speaker 12. While in this example mobile phone 1 includes LCD 15, an organic EL (Electro-Luminescence) display may be used instead of LCD 15. Operation side portion 3 and display side portion 2 are rotatably coupled to one another on a hinge mechanism, so that they are freely exposed/hidden. In the closed style, mobile phone 1 is folded to hide operation side portion 3 and display side portion 2, while in the open style, mobile phone 1 is opened to expose operation side portion 3 and display side portion 2.

FIG. 2 is a functional block diagram schematically showing the functions of the mobile phone according to the embodiment of the present invention. Referring to FIG. 2, mobile phone 1 includes a control portion 21 to generally control mobile phone 1, a wireless circuit 22 connected to an antenna 22A, a codec portion 28 to process audio data, a switching portion 29 to switch between input and output of audio, an earphone microphone switching portion 50 connected to switching portion 29, a microphone 13 connected to switching portion 29, a first speaker 11 connected to switching portion 29, a second speaker 12 connected to switching portion 29, an earphone microphone terminal 16, operation keys 14 to accept input of operations from users, an oscillating portion 26, a display control portion 30 to control display of LCD 15, an EEPROM (Electronically Erasable and Programmable Read Only Memory) 31 to store programs and the like executed by control portion 21, and a RAM (Random Access Memory) 32 used as a working area for control portion 21.

Wireless circuit 22 accepts input of a wireless signal received by antenna 22A and outputs an audio signal resulting from demodulating the wireless signal to codec portion 28. Wireless circuit 22 also accepts input of an audio signal from codec portion 28 and outputs a wireless signal resulting from modulating the audio signal to antenna 22A. Codec portion 28 demodulates an audio signal input from wireless circuit 22, converts the demodulated, digital audio signal into an analog one, amplifies the analog audio signal, and outputs the amplified audio signal to switching portion 29. Codec portion 28 accepts input of an analog audio signal from microphone 13 or earphone microphone terminal 16 through switching portion 29, converts the analog audio signal into a digital one, encodes the digital audio signal, and outputs the encoded audio signal to wireless circuit 22.

Switching portion 29 is controlled by control portion 21 to switch between input and output of audio signals to and from codec portion 28. Switching portion 29 outputs an audio signal accepted from codec portion 28 to earphone microphone switching portion 50, first speaker 11, or second speaker 12. Earphone microphone switching portion 50 is connected to earphone microphone terminal 16. To earphone microphone terminal 16, any of the plugs of an earphone microphone 60 (see FIG. 3) and a PTT earphone microphone 70 (see FIG. 4) is mountable.

Earphone microphone switching portion 50 makes a judgment as to whether any earphone microphone or PTT earphone microphone is being connected to earphone microphone terminal 16, and when there is a connection, as to which of the earphone microphone and the PTT earphone microphone is being connected. Details of earphone microphone switching portion 50 will be described later.

When an earphone microphone or a PTT earphone microphone is connected to earphone microphone terminal 16, switching portion 29 outputs the audio signal accepted from codec portion 28 to earphone microphone terminal 16 through earphone microphone switching portion 50. When neither the earphone microphone nor the PTT earphone microphone is connected to earphone microphone terminal 16 while mobile phone 1 is in a hands-free mode, then switching portion 29 outputs the audio signal accepted from codec portion 28 to second speaker 12. When mobile phone 1 is not in the hands-free mode, switching portion 29 outputs the audio signal accepted from codec portion 28 to first speaker 11. Mobile phone 1 is set at the hands-free mode by a user's operation of operation keys 14. When mobile phone 1 is not set at the hands-free mode while a call is in progress in the open style, control portion 21 sets mobile phone 1 at the hands-free mode upon change to the closed style. Thus, when mobile phone 1 is not set at the hands-free mode while a call is in progress in the open style, switching portion 29 outputs the audio signal accepted from codec portion 28 to first speaker 11, while outputting the audio signal accepted from codec portion 28 to second speaker 12 upon change in mobile phone 1 to the closed style.

Switching portion 29 outputs to codec portion 28 an audio signal output from either microphone 13 or earphone microphone switching portion 50. When an earphone microphone or a PTT earphone microphone is connected to earphone microphone terminal 16, switching portion 29 outputs an audio signal accepted from earphone microphone switching portion 50 to codec portion 28, while when neither the earphone microphone nor PTT earphone microphone is connected to earphone microphone terminal 16, switching portion 29 outputs an audio signal accepted from microphone 13 to codec portion 28.

Display control portion 30 is controlled by control portion 21 to control LCD 15 in accordance with instructions input from control portion 21, thereby causing LCD 15 to display images. The images that LCD 15 displays include moving images and still images.

To a card I/F 27, a detachable flash memory 27A is mounted. Control portion 21 has access to flash memory 27A through card I/F 27. While in this example a program for control portion 21 to execute is stored in EEPROM 31, it is also possible to store the program in flash memory 27A and then read the program from flash memory 27A so that control portion 21 executes the program. The recording medium to store the program is not limited to flash memory 27A but may also be a flexible disk, a cassette tape, an optical disk (CD-ROM (Compact Disc-ROM)/MO (Magnetic Optical Disc)/MD (Mini Disc)/DVD (Digital Versatile Disc)), an IC card, an optical card, and a semiconductor memory such as a masked ROM, an EPROM, an EEPROM, and the like. Alternatively, mobile phone 1 may be connected to the Internet through wireless circuit 22 to download a program from a computer connected to the Internet so that control portion 21 executes the program. The program, as used herein, not only includes a program directly executable by control portion 21, but also a program in a source program form, a compressed program, and an encoded program.

Figure 3:
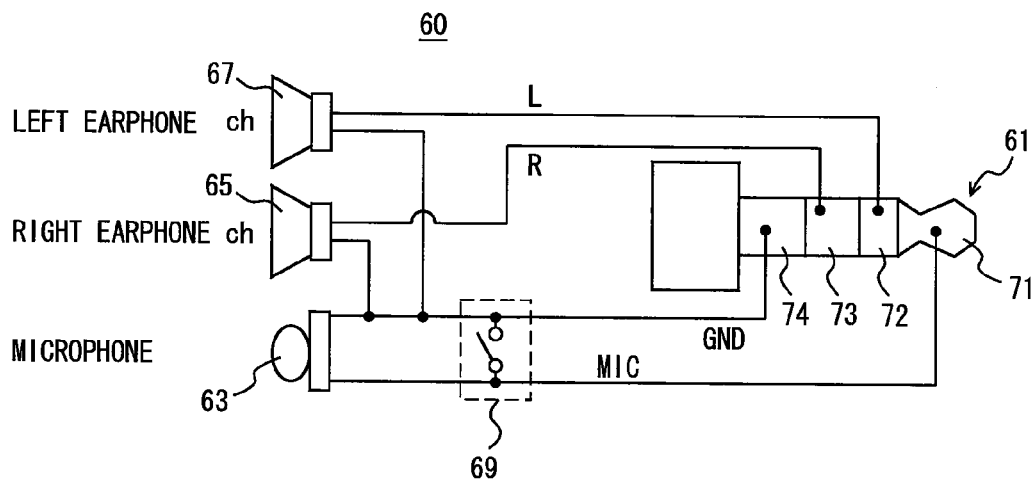
FIG. 3 is a block diagram showing a circuit configuration of an earphone microphone.

FIG. 3 is a block diagram showing a circuit configuration of earphone microphone 60. Referring to FIG. 3, earphone microphone 60 includes a plug 61, a microphone 63, a right earphone 65, a left earphone 67, and a microphone switch 69. Plug 61 includes first to forth terminals 71 to 74. Microphone 63 is connected to first terminal 71 and forth terminal 74, right earphone 65 is connected to third terminal 73 and fourth terminal 74, and left earphone 67 is connected to second terminal 72 and fourth terminal 74. Microphone switch 69 is connected in parallel to microphone 63.

Figure 4:
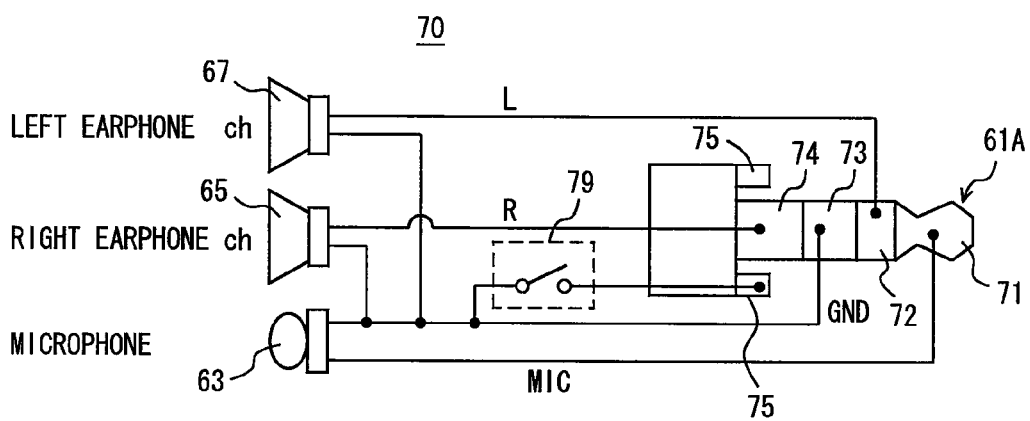
FIG. 4 is a block diagram showing a circuit configuration of a PTT earphone microphone.

FIG. 4 is a block diagram showing a circuit configuration of a PTT earphone microphone. The same parts as those of the earphone microphone shown in FIG. 3 are denoted by the same reference characters. Referring to FIG. 4, a PTT earphone microphone 70 includes a plug 61A, a microphone 63, a right earphone 65, a left earphone 67, and a PTT switch 79. Plug 61A includes a fifth terminal 75 in addition to first to forth terminals 71 to 74. Microphone 63 is connected to first terminal 71 and third terminal 73, right earphone 65 is connected to fourth terminal 74 and third terminal 73, and left earphone 67 is connected to second terminal 72 and third terminal 73. PTT switch 79 is connected to fifth terminal 75 and third terminal 73.

Referring to FIGS. 3 and 4, plug 61A of PTT earphone microphone 70 is of the same shape as that of plug 61 of earphone microphone 60 as far as the arrangement of first to forth terminals 71 to 74 is concerned, and is of a different shape with fifth terminal 75 added to earphone microphone 70. Plug 61 of earphone microphone 60 and plug 61A of PTT earphone microphone 70 have the same manner of connection in that the first and second terminals are respectively connected to microphone 63 and left earphone 67, while having reverse manners of connection for third terminal 73 and fourth terminal 74.

Figure 5:
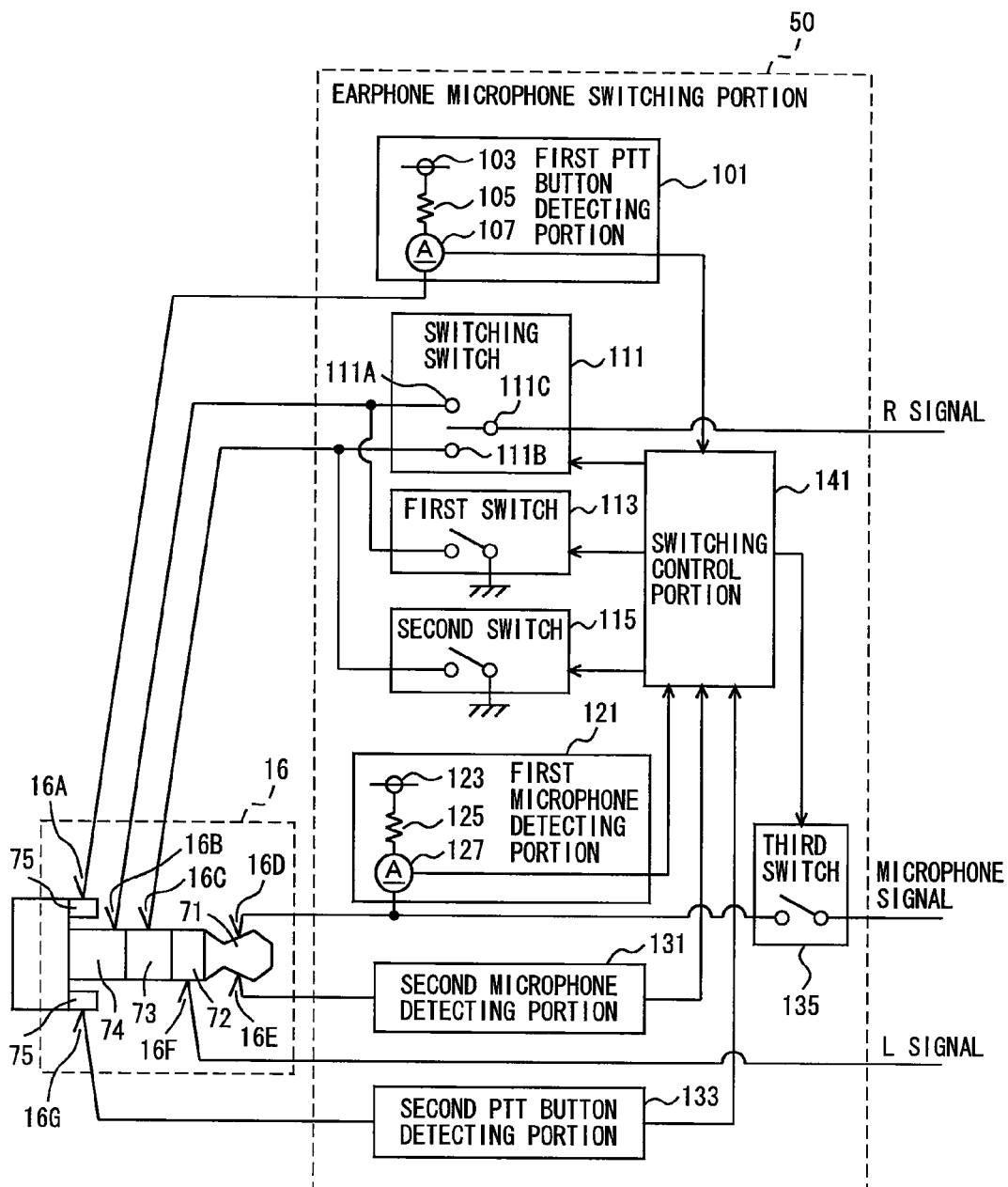
FIG. 5 is a block diagram showing a configuration of an earphone microphone terminal and a configuration of an earphone microphone switching portion.

FIG. 5 is a block diagram showing a configuration of earphone microphone terminal 16 and a configuration of earphone microphone switching portion 50. Referring to FIG. 5, earphone microphone terminal 16 includes first to seven contact points 16A to 16G. When plug 61A of PTT earphone microphone 70 is inserted, first contact point 16A and seventh contact point 16G are electrically connected to one another through fifth terminal 75 of plug 61A.

When plug 61 of earphone microphone 60 or plug 61A of PTT earphone microphone 70 is inserted, second contact point 16B is electrically connected to fourth terminal 74 of plug 61 or plug 61A. When plug 61 of earphone microphone 60 or plug 61A of PTT earphone microphone 70 is inserted, third contact point 16C is electrically connected to third terminal 73 of plug 61 or plug 61A. When plug 61 of earphone microphone 60 or plug 61A of PTT earphone microphone 70 is inserted, fourth contact point 16D and fifth contact point 16E are electrically connected to first terminal 71 of plug 61 or plug 61A. When plug 61 of earphone microphone 60 or plug 61A of PTT earphone microphone 70 is inserted, sixth contact point 16F is electrically connected to second terminal 72 of plug 61 or plug 61A.

Earphone microphone switching portion 50 includes a first PTT button detecting portion 101, a switch portion 111, a first switch 113, a second switch 115, a first microphone detecting portion 121, a second microphone detecting portion 131, a second PTT button detecting portion 133, a third switch 135, and a switching control portion 141.

First PTT button detecting portion 101 includes a power source 103, a resistor 105, and an ammeter 107. First PTT button detecting portion 101 is connected to first contact point 16A of earphone microphone terminal 16. Resistor 105 and ammeter 107 are arranged in series between first contact point 16A and power source 103. First PTT button detecting portion 101 outputs a current value measured by ammeter 107 to switching control portion 141.

Switch portion 111 includes contact points 111A, 111B, and 111C. Contact point 111C is connected to an output terminal of a right earphone signal (R signal) of switching portion 29. Contact point 111A is connected to second contact point 16B of earphone microphone terminal 16, and contact point 111B is connected to third contact point 16C of earphone microphone terminal 16. Switch portion 111 is controlled by switching control portion 141 to switch contact point 111C between three states including the state of being connected to either contact point 111A or contact point 111B and the state of being connected to neither contact point 111A nor contact point 111B (open state).

First switch 113 is connected to second contact point 16B of earphone microphone terminal 16 at one end and grounded at the other end. First switch 113 is controlled by switching control portion 141. When switched ON, first switch 113 turns into a state of grounding second contact point 16B of earphone microphone terminal 16, while turning into a state of not grounding second contact point 16B of earphone microphone terminal 16 when switched OFF.

Second switch 115 is connected to third contact point 16C of earphone microphone terminal 16 at one end and grounded at the other end. Second switch 115 is controlled by switching control portion 141. When switched ON, second switch 115 turns into a state of grounding third contact point 16C of earphone microphone terminal 16, while turning into a state of not grounding third contact point 16C of earphone microphone terminal 16 when switched OFF.

First microphone detecting portion 121 includes a power source 123, a resistor 125, and an ammeter 127. First microphone detecting portion 121 has ammeter 127 connected to fourth contact point 16D of earphone microphone terminal 16, and has resistor 125 and ammeter 127 arranged in series between fourth contact point 16D and power source 123. First microphone detecting portion 121 outputs a current value measured by ammeter 127 to switching control portion 141.

Third switch 135 is connected to fourth contact point 16D of earphone microphone terminal 16 at one end and to a microphone signal input terminal of switching portion 29 at the other end. Third switch 135 is controlled by switching control portion 141. When switched ON, third switch 135 turns into a state of connecting fourth contact point 16D of earphone microphone terminal 16 and the microphone signal input terminal of switching portion 29 to one another, while turning into a state of not connecting fourth contact point 16D of earphone microphone terminal 16 and the microphone signal input terminal of switching portion 29 to one another when switched OFF.

Second microphone detecting portion 131 is connected to fifth contact point 16E of earphone microphone terminal 16 to detect voltage at fifth contact point 16E. Second microphone detecting portion 131 outputs the detected voltage to switching control portion 141.

Second PTT button detecting portion 133 is connected to seventh contact point 16G of earphone microphone terminal 16 to detect voltage at seventh contact point 16G. Second PTT button detecting portion 133 outputs the detected voltage to switching control portion 141.

Switching control portion 141 connects sixth contact point 16F of earphone microphone terminal 16 to an output terminal of a left earphone signal (L signal) of switching portion 29. In addition, switching control portion 141 switches switch portion 111, first switch 113, second switch 115, and third switch 135. Specifically, in an initial state, switching control portion 141 switches contact point 111C into an open state of being connected to neither contact point 111A nor contact point 111B, and switches ON first switch 113 and second switch 115. This grounds second contact point 16B and third contact point 16C of earphone microphone terminal 16. When PTT earphone microphone 70 or earphone microphone 60 is inserted to earphone microphone terminal 16, all the terminals connected to right earphone 65 are grounded, and therefore no current flows through right earphone 65. This prevents failure of right earphone 65.

First microphone detecting portion 121 is connected to fourth contact point 16D of earphone microphone terminal 16, which causes a predetermined level of voltage to be applied to fourth contact point 16D. First PTT button detecting portion 101 is connected to first contact point 16A of earphone microphone terminal 16, which causes a predetermined level of voltage to be applied to first contact point 16A.

FIG. 6 is a diagram showing detection states at switching control portion 141. The detection states shown in FIG. 6 are associated with second PTT button detecting portion 133, first PTT button detecting portion 101, second microphone detecting portion 131, and first microphone detecting portion 121 according to connection states of earphone microphone terminal 16. The connection states of earphone microphone terminal 16 include five states: nothing is connected; PTT earphone microphone 70 with PTT switch 79 OFF (open) is connected; PTT earphone microphone 70 with PTT switch 79 ON is connected; earphone microphone 60 with microphone switch 69 OFF (open) is connected; and earphone microphone 60 with microphone switch 69 ON is connected. The character L in the table indicates that the detected voltage is lower than a predetermined value, while the character H indicates that the detected voltage is higher than the predetermine value. The word "Detected" in the table indicates that the detected current is higher than a predetermined value, while the word "Undetected" indicates that the detected current is lower than the predetermined value.

Referring to FIGS. 5 and 6, when nothing is inserted to earphone microphone terminal 16, first contact point 16A and seventh contact point 16G of earphone microphone terminal 16 are not electrically connected to one another, and therefore no voltage is applied to seventh contact point 16G. Thus, second PTT button detecting portion 133 detects a lower voltage than a predetermined value and thus turns into the "L" state. First PTT button detecting portion 101, where no current flows through ammeter 107, detects a lower current than a predetermined value and thus turns into the "Undetected" state.

Fourth contact point 16D and fifth contact point 16E of earphone microphone terminal 16 are not electrically connected to one another, and therefore second microphone detecting portion 131 detects a lower voltage than the predetermined value and thus turns into the "L" state. First microphone detecting portion 121, where no current flows through ammeter 127, detects a lower current than the predetermined value and thus turns into the "Undetected" state.

When PTT earphone microphone 70 is inserted to earphone microphone terminal 16, first contact point 16A and seventh contact point 16G of earphone microphone terminal 16 are electrically connected to one another. When PTT switch 79 of PTT earphone microphone 70 is OFF, seventh contact point 16G is applied the same level of voltage as the one applied to first contact point 16A, and thus second PTT button detecting portion 133 detects a higher voltage than the predetermined value and thus turns into the "H" state. First PTT button detecting portion 101, where no current flows through ammeter 107, does not detect a larger current than the predetermined value and thus turns into the "Undetected" state.

When PTT switch 79 of PTT earphone microphone 70 is ON, seventh contact point 16G is electrically connected to third contact point 16C. Since third contact point 16C is grounded through second switch 115, seventh contact point 16G is also grounded. Second PTT button detecting portion 133 detects a lower voltage than the predetermined value and thus turns into the "L" state. First PTT button detecting portion 101, where a current flows through ammeter 107, detects a higher current than the predetermined value and thus turns into the "Detected" state.

When earphone microphone 60 is inserted to earphone microphone terminal 16, first contact point 16A and seventh contact point 16G of earphone microphone terminal 16 are not electrically connected to one another. Thus, second PTT button detecting portion 133 detects a lower voltage than the predetermined value and thus turns into the "L" state. First PTT button detecting portion 101, where no current flows through ammeter 107, does not detect a higher current than the predetermined value and thus turns into the "Undetected" state.

Thus, when detecting that second PTT button detecting portion 133 turns into the "H" state, switching control portion 141 judges that PTT earphone microphone 70 with PTT switch 79 OFF is connected, while judging that PTT earphone microphone 70 with PTT switch 79 ON is connected when detecting that first PTT button detecting portion 101 turns into the "Detected" state.

When detecting that PTT earphone microphone 70 is connected, in other words, that second PTT button detecting portion 133 turns into the "H" state or that first PTT button detecting portion 101 turns into the "Detected" state, then switching control portion 141 switches to the second contact point 16B side to connect contact point 111C and contact point 111A of switch portion 111 to one another, switches OFF first switch 113, switches ON second switch 115, and switches ON third switch 135. This connects first terminal 71 of plug 61A of PTT earphone microphone 70 to the microphone signal input of switching portion 29, connects second terminal 72 to the L signal output terminal of switching portion 29, grounds third terminal 73, and connects fourth terminal 74 to the R signal output terminal of switching portion 29.

When PTT earphone microphone 70 or earphone microphone 60 is inserted to earphone microphone terminal 16, fourth contact point 16D and fifth contact point 16E of earphone microphone terminal 16 are electrically connected to one another. When plug 61A of PTT earphone microphone 70 is inserted, fifth contact point 16E is electrically connected to third contact point 16C through microphone 63. When plug 61 of earphone microphone 60 with microphone switch 69 OFF is inserted, fifth contact point 16E is electrically connected to second contact point 16B through microphone 63. Since third contact point 16C and second contact point 16B are respectively grounded through second switch 115 and first switch 113, second microphone detecting portion 131 detects a larger voltage at fifth contact point 16E than the predetermined value, thus turning into the "H" state. First microphone detecting portion 121, though a current flows through ammeter 127, detects a lower current than the predetermined value and thus turns into the "Undetected" state.

When plug 61 of earphone microphone 60 with microphone switch 69 ON is inserted, fifth contact point 16E is electrically connected to second contact point 16B. Since second contact point 16B is grounded through first switch 113, fifth contact point 16E is also grounded. Although second microphone detecting portion 131 detects a lower voltage than the predetermined value and thus turns into the "L" state, first microphone detecting portion 121 detects a higher current than the predetermined value because a current flows through ammeter 127, thus turning into the "Detected" state.

Thus, when neither first PTT button detecting portion 101 nor second PTT button detecting portion 133 detects PTT earphone microphone 70, then switching control portion 141 judges that earphone microphone 60 with microphone switch 69 OFF is connected in the case of the "H" state detected at second microphone detecting portion 131, while judging that earphone microphone 60 with microphone switch 69 ON is connected in the case of the "Detected" state detected at first microphone detecting portion 121.

When judging that earphone microphone 60 is connected, in other words, when detecting that second microphone detecting portion 131 turns into the "H" state or when detecting that first microphone detecting portion 121 turns into the "Detected" state while neither first PTT button detecting portion 101 nor second PTT button detecting portion 133 detects PTT earphone microphone 70, switching control portion 141 switches to the third contact point 16C side to connect contact point 111C and contact point 111B of switch portion 111 to one another, switches ON first switch 113, switches OFF second switch 115, and switches ON third switch 135. This connects first terminal 71 of plug 61 of earphone microphone 60 to the microphone signal input of switching portion 29, connects second terminal 72 to the L signal output terminal of switching portion 29, connects third terminal 73 to the R signal output terminal of switching portion 29, and grounds fourth terminal 74.

Figure 7:
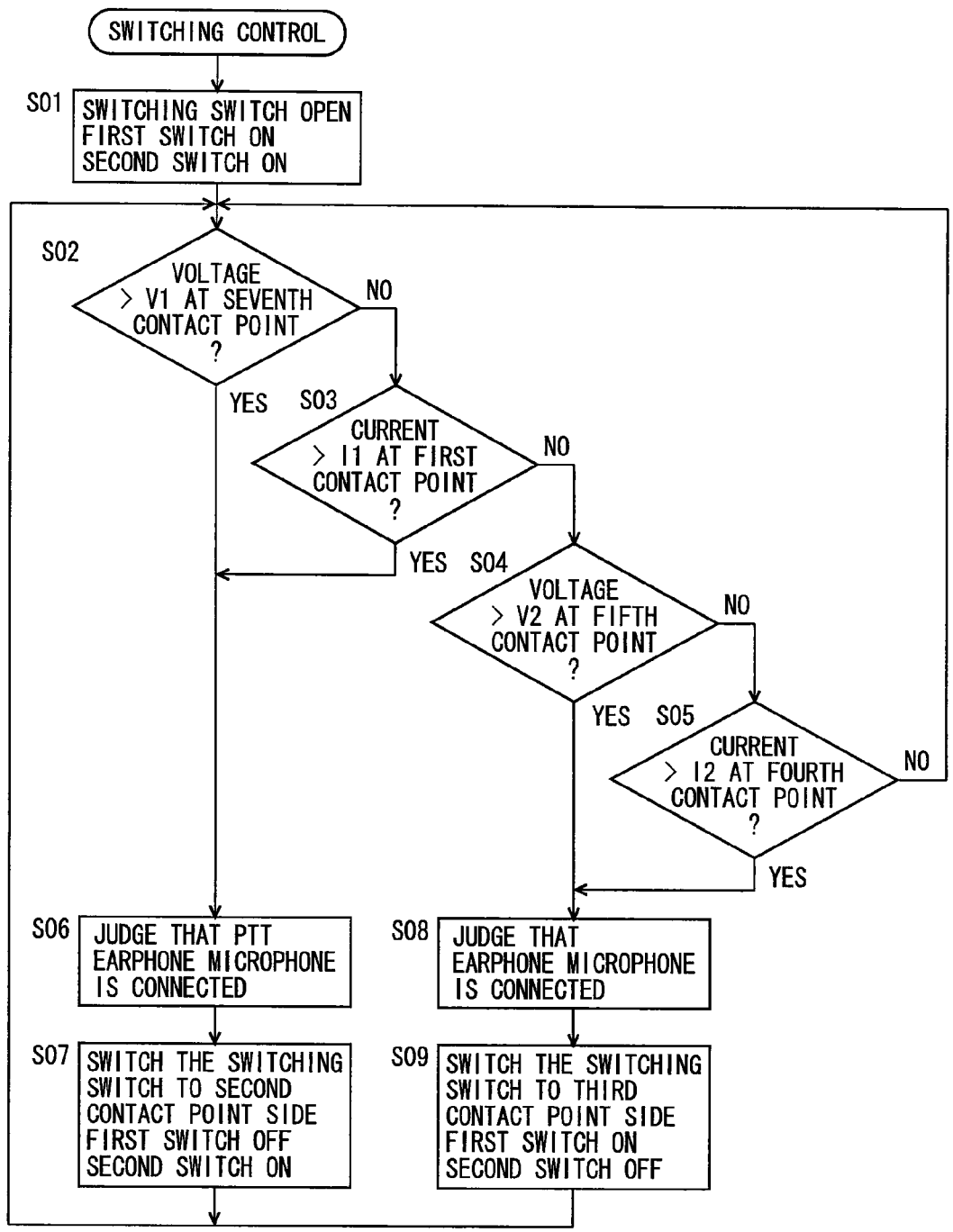
FIG. 7 is a flowchart showing an example of the flow of switching control processing.

Next, the operation of switching control portion 141 will be described. FIG. 7 is a flowchart showing an example of the flow of switching control processing. The switching control processing is executed by switching control portion 141 when it executes a switching control program. First, switching control portion 141 sets switch portion 111, first switch 113, and second switch 115 at initial states (step S01). Specifically, switching control portion 141 switches switch portion 111 to the open state, where contact point 111C is connected to neither contact point 111A nor contact point 111B, and switches first switch 113 and second switch 115 ON. This grounds second contact point 16B and third contact point 16C of earphone microphone terminal 16 and causes a predetermined level of voltage to be applied to fourth contact point 16D of earphone microphone terminal 16. First PTT button detecting portion 101 is connected to first contact point 16A of earphone microphone terminal 16, which causes a predetermined level of voltage to be applied to first contact point 16A.

In the next step S02, switching control portion 141 judges whether the voltage at seventh contact point 16G is higher than a threshold value V1. When the voltage at seventh contact point 16G is higher than threshold value V1, switching control portion 141 proceeds the processing to step S06, while otherwise proceeding the processing to step S03. When PTT earphone microphone 70 with PTT switch 79 ON is inserted, seventh contact point 16G is electrically connected to third contact point 16C to be grounded, while when earphone microphone 60 is inserted, seventh contact point 16G is not electrically connected to any contact points. Thus, the voltage at seventh contact point 16G is higher than threshold value V1 only when PTT earphone microphone 70 with PTT switch 79 ON is connected.

In step S03, switching control portion 141 judges whether the current through first contact point 16A is higher than a threshold value I1. When the current through first contact point 16A is higher than threshold value I1, switching control portion 141 proceeds to the processing to step S06, while otherwise proceeding the processing to step S04. When PTT earphone microphone 70 with PTT switch 79 OFF is inserted, PTT switch 79 opens the circuitry and thus no current flows through first contact point 16A, while when earphone microphone 60 is inserted, no current flows through first contact point 16A. Thus, the current through first contact point 16A is higher than threshold value I1 only when PTT earphone microphone 70 with PTT switch 79 ON is connected.

In step S04, switching control portion 141 judges whether the voltage at fifth contact point 16E is higher than a threshold value V2. When the voltage at fifth contact point 16E is higher than threshold value V2, switching control portion 141 proceeds the processing to step S08, while otherwise proceeding the processing to step S05. When earphone microphone 60 with microphone switch 69 ON is connected, fifth contact point 16E is electrically connected to second contact point 16B to be grounded, while when PTT earphone microphone 70 or earphone microphone 60 with microphone switch 69 OFF is connected, the voltage at fifth contact point 16E becomes the same as the one at fourth contact point 16D.

In step S05, switching control portion 141 judges whether the current through fourth contact point 16D is higher than a threshold value I2. When the current through fourth contact point 16D is higher than threshold value I2, switching control portion 141 proceeds the processing to step S08, while otherwise returning the processing to step S02. The case of returning the processing to step S02 is when nothing is inserted to earphone microphone terminal 16. When earphone microphone 60 with microphone switch 69 ON or PTT earphone microphone 70 is inserted, fourth contact point 16D is connected to microphone 63, and thus no current higher than threshold value I2 flows through first contact point 16A. Thus, the current through first contact point 16A is higher than threshold value I2 only when earphone microphone 60 with microphone switch 69 ON is inserted.

In step S06, switching control portion 141 judges that PTT earphone microphone 70 is connected to earphone microphone terminal 16, and proceeds the processing to step S07. In step S07, switching control portion 141 switches switch portion 111 to the second contact point 16B side, switches OFF first switch 113, and switches ON second switch 115. This connects first terminal 71 of plug 61A of PTT earphone microphone 70 to the microphone signal input of switching portion 29, connects second terminal 72 to the L signal output terminal of switching portion 29, grounds third terminal 73, and connects fourth terminal 74 to the R signal output terminal of switching portion 29.

In steps S08, switching control portion 141 judges that earphone microphone 60 is connected to earphone microphone terminal 16, and proceeds the processing to step S09. In step S09, switching control portion 141 switches switch portion 111 to the third contact point 16C side, switches ON first switch 113, switches OFF second switch 115, and switches ON third switch 135. This connects first terminal 71 of plug 61 of earphone microphone 60 to the microphone signal input of switching portion 29, connects second terminal 72 to the L signal output terminal of switching portion 29, connects third terminal 73 to the R signal output terminal of switching portion 29, and grounds fourth terminal 74.

As has been described hereinbefore, mobile phone 1 according to the embodiment of the present invention detects that plug 61A of PTT earphone microphone 70 or plug 61 of earphone microphone 60 is connected to earphone microphone terminal 16, and grounds second contact point 16B or third contact point 16C of earphone microphone terminal 16 depending on the kind of the detected earphone microphone. This enables connection of both plug 61A of PTT earphone microphone 70 and plug 61 of earphone microphone 60.

Among first to seventh contact points 16A to 16G of earphone microphone terminal 16, second contact point 16B and third contact point 16C are grounded, and among the ungrounded contact points, first contact point 16A and fourth contact point 16D are applied voltage, and the currents through first contact point 16A and fourth contact point 16D and the voltages at fifth contact point 16E and seventh contact point 16G are detected. The voltage detection enables it to detect connection of an earphone microphone. Even when the voltage-applied contact points are grounded, the current detection enables connection of an earphone microphone.

Varying the contact points to be grounded enables it to judge the kind of the earphone microphone.

Second contact point 16B, which is connected to right earphone 65 when PTT earphone microphone 70 is connected, and third contact point 16C, which is connected to right earphone 65 when earphone microphone 60 is connected, are grounded. This prevents current from flowing through right earphones 65 of PTT earphone microphone 70 and earphone microphone 60, thereby preventing failure thereof.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An electronic appliance for use with at least a first kind of earphone microphone having a plug and a second kind of earphone microphone having a plug, the electronic appliance comprising:
    an accepting portion to accept the plug of the first kind of earphone microphone or the plug of the second kind of earphone microphone,
    wherein the accepting portion comprises a plurality of contact points,
    wherein the plug of the first kind and the plug of the second kind each comprise a plurality of terminals including a ground,
    wherein, when the plug of the first kind is accepted into the accepting portion, its ground contacts a first one of the plurality of contact points, and
    wherein, when the plug of the second kind is accepted into the accepting portion, its ground contacts a second one of the plurality of contact points that is different than the first contact point;
    a detecting portion to detect whether the plug of the first kind of earphone microphone or the plug of the second kind of earphone microphone is accepted;
    a grounding portion; and
    a switching portion that, after the detecting portion has detected whether the plug of the first kind of earphone microphone or the plug of the second kind of earphone microphone is accepted when the plug of the first kind of earphone microphone is detected, connects the first contact point to the grounding portion, and,
    when the plug of the second kind of earphone microphone is detected, connects the second contact point to the grounding portion.

2. The electronic appliance according to claim 1, wherein the detecting portion includes:
    a voltage applying portion to apply voltage to an ungrounded contact point among the plurality of contact points;
    a voltage detecting portion to detect voltage at the voltage-applied contact point; and
    a current detecting portion to detect current through the voltage-applied contact point.

3. The electronic appliance according to claim 2,
    wherein, when the plug of the second kind is accepted into the accepting portion, one of its plurality of terminals contacts a third one of the plurality of contact points,
    wherein, when the plug of the first kind is accepted into the accepting portion, none of its plurality of terminals contacts the third contact point, and
    wherein the voltage applying portion applies voltage to the third contact point.

4. The electronic appliance according to claim 2, wherein the voltage applying portion applies voltage to a third one of the plurality of contact points, the third contact point contacting a terminal for a microphone of the first kind of earphone microphone when the first kind of earphone microphone is accepted and contacting a terminal for a microphone of the second kind of earphone microphone when the second kind of earphone microphone is accepted.

5. The electronic appliance according to claim 1,
    wherein, when the plug of the first kind is accepted into the accepting portion, a terminal for a speaker, from among its plurality of terminals, contacts the second contact point, and
    wherein, when the plug of the second kind is accepted into the accepting portion, a terminal for a speaker, from among its plurality of terminals, contacts the first contact point.

6. The electronic appliance according to claim 1, further comprising:
    a first switch on an electrical path between the first contact point and the grounding portion; and
    a second switch on an electrical path between the second contact point and the grounding portion;
    wherein connecting the first contact point to the grounding portion comprises switching the first switch from an open state to a closed state; and
    wherein connecting the second contact point to the grounding portion comprises switching the second switch from an open state to a closed state.

7. The electronic appliance according to claim 1, wherein the switching portion:
    when the plug of the first kind of earphone microphone is detected, further connects the second contact point to an input signal, and,
    when the plug of the second kind of earphone microphone is detected, further connects the first contact point to the input signal.

8. The electronic appliance according to claim 7, further comprising a switch, wherein connecting the second point to the input signal comprises configuring the switch to create an electrical path between the second contact point and the input signal, and wherein connecting the first contact point to the input signal comprises configuring the switch to create an electrical path between the first contact point and the input signal.

9. The electronic appliance according to claim 7, wherein the input signal comprises a first speaker signal.

10. The electronic appliance according to claim 9, wherein the first speaker signal comprises a right speaker signal.

11. The electronic appliance according to claim 9, wherein the switching portion:
    when the plug of the first kind of earphone microphone is detected, further connects a third one of the plurality of contact points to a microphone signal, and connects a fourth one of the plurality of contact points to a second speaker signal; and,
    when the plug of the second kind of earphone microphone is detected, further connects the third contact point to the microphone signal, and connects the fourth contact point to the second speaker signal.

12. An electronic appliance for use with a plug of a first kind and a plug of a second kind, the electronic appliance comprising:
- an accepting portion to accept the plug of the first kind or the plug of the second kind,
- wherein the accepting portion comprises a plurality of contact points comprising a first contact point, a second contact point, a third contact point, a fourth contact point, a fifth contact point, a sixth contact point, and a seventh contact point,
- wherein the plug of the first kind comprises a microphone terminal, a first speaker terminal, a second speaker terminal, and a ground,
- wherein, when the plug of the first kind is accepted into the accepting portion, the microphone terminal contacts the fourth contact point and the fifth contact point, the first speaker terminal contacts the third contact point, the second speaker terminal contacts the sixth contact point, and the ground contacts the second contact point,
- wherein the plug of the second kind comprises a microphone terminal, a first speaker terminal, a second speaker terminal, a ground, and a push-to-talk terminal, and
- wherein, when the plug of the second kind is accepted into the accepting portion, the microphone terminal contacts the fourth contact point and the fifth contact point, the first speaker terminal contacts the second contact point, the second speaker terminal contacts the sixth contact point, the ground contacts the third contact point, and the push-to-talk terminal contacts the first contact point and the seventh contact point;
- a detecting portion to detect whether the plug of the first kind or the plug of the second kind is accepted;
- a grounding portion; and
- a switching portion that, after the detecting portion has detected whether the plug of the first kind or the plug of the second kind is accepted,
- when the plug of the first kind is detected,
  - connects the second contact point to the grounding portion,
  - connects the third contact point to a first speaker signal, and
  - connects the fourth contact point to a microphone signal, and,
- when the plug of the second kind is detected,
  - connects the second contact point to the first speaker signal portion,
  - connects the third contact point to the ground portion, and
  - connects the fourth contact point to the microphone signal.

13. The electronic appliance according to claim 12, wherein the detecting portion comprises:
- a push-to-talk detecting portion that measures a current at the first contact point and a voltage at the seventh contact point; and
- a microphone detecting portion that measures a current at the fourth contact point and a voltage at the fifth contact point; wherein,
- when the measured current at the first contact point is greater than a first threshold current value or the measured voltage at the seventh contact point is greater than a first threshold voltage value, the detecting portion detects the plug of the first kind; and
- wherein, when the measured current at the fourth contact point is greater than a second threshold current value or the measured voltage at the fifth contact point is greater than a second threshold voltage value, the detecting portion detects the plug of the second kind.

* * * * *